US009529209B2

(12) United States Patent
Nakamura et al.

(10) Patent No.: US 9,529,209 B2
(45) Date of Patent: Dec. 27, 2016

(54) BLUR COMPENSATION DEVICE, LENS BARREL, AND CAMERA DEVICE

(71) Applicant: NIKON CORPORATION, Tokyo (JP)

(72) Inventors: Kenta Nakamura, Kawasaki (JP); Toshihisa Tanaka, Yokohama (JP); Takayuki Shinohara, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 127 days.

(21) Appl. No.: 14/323,555

(22) Filed: Jul. 3, 2014

(65) Prior Publication Data

US 2014/0313583 A1    Oct. 23, 2014

Related U.S. Application Data

(63) Continuation of application No. PCT/JP2012/084128, filed on Dec. 28, 2012.

(30) Foreign Application Priority Data

Jan. 4, 2012    (JP) ................. 2012-000282

(51) Int. Cl.
   *G02B 27/64*    (2006.01)
   *G02B 15/15*    (2006.01)
   *G03B 5/00*    (2006.01)

(52) U.S. Cl.
   CPC ............. *G02B 27/646* (2013.01); *G02B 15/15* (2013.01); *G03B 5/00* (2013.01); *G03B 2205/0015* (2013.01); *Y10T 29/49* (2015.01)

(58) Field of Classification Search
   CPC ... G02B 27/646; G02B 27/0025; G02B 15/15; G03B 5/00; G03B 2205/00; G03B 2205/0007; G06T 5/003; G06T 2207/20201

(Continued)

(56) References Cited

U.S. PATENT DOCUMENTS

2006/0070302 A1    4/2006   Seo
2007/0183766 A1*   8/2007   Miyamori ................ G03B 5/02
                                                            396/55

(Continued)

FOREIGN PATENT DOCUMENTS

JP     A-7-274056    10/1995
JP     A-10-254019    9/1998

(Continued)

OTHER PUBLICATIONS

International Search Report issued in International Application No. PCT/JP2012/084128 mailed Apr. 16, 2013.

(Continued)

*Primary Examiner* — Bumsuk Won
*Assistant Examiner* — Ephrem Mebrahtu
(74) *Attorney, Agent, or Firm* — Oliff PLC

(57)    ABSTRACT

A blur compensation device (100) comprises; a movable member (130) which is relatively movable to a fixed member (140); a blur compensation optical member (L3) which is provided with the movable member (130) and compensates an image blur; first drive parts (132, 142) which move the movable member (130) along a first axis (X') on a drive face crossing an optical axis (L) of the blur compensation optical member (L3); and drive parts (132, 142) which move the movable member (130) along a second axis (Y') crossing the first axis (X') on the drive face, wherein an intersection point (M) of the first axis (X') with the second axis (Y') is located nearer to the gravity center (G) of the movable member (130) than the center (O) of the blur compensation optical member (L3) on the drive face.

24 Claims, 16 Drawing Sheets

(58) Field of Classification Search
USPC ............. 359/554, 557; 396/52, 55; 382/255; 348/207.99, 208.4, 208.5, 208.7, 208.13, 348/208.99
See application file for complete search history.

(56) References Cited

U.S. PATENT DOCUMENTS

| | | |
|---|---|---|
| 2009/0185042 A1 | 7/2009 | Miyahara |
| 2009/0185796 A1* | 7/2009 | Tsutsumi ................. G03B 5/00 396/55 |
| 2010/0033820 A1 | 2/2010 | Omi |
| 2010/0195206 A1 | 8/2010 | Miyamori et al. |
| 2010/0284097 A1 | 11/2010 | Masuki |
| 2011/0181740 A1* | 7/2011 | Watanabe ................ G03B 3/10 348/208.2 |

FOREIGN PATENT DOCUMENTS

| | | |
|---|---|---|
| JP | A-11-44898 | 2/1999 |
| JP | A-2005-173372 | 6/2005 |
| JP | A-2006-23556 | 1/2006 |
| JP | A-2006-108956 | 4/2006 |
| JP | A-2007-232980 | 9/2007 |
| JP | A-2007-241201 | 9/2007 |
| JP | A-2007-286169 | 11/2007 |
| JP | A-2008-209435 | 9/2008 |
| JP | A-2008-257106 | 10/2008 |
| JP | A-2009-145771 | 7/2009 |
| JP | A-2009-169359 | 7/2009 |
| JP | A-2009-169360 | 7/2009 |
| JP | A-2009-237583 | 10/2009 |
| JP | A-2009-265180 | 11/2009 |
| JP | 2011-004075 A | 1/2011 |
| WO | WO 2008/155906 A1 | 12/2008 |

OTHER PUBLICATIONS

International Preliminary Report on Patentability issued in International Application No. PCT/JP2012/084128 issued Jul. 8, 2014.

* cited by examiner

BLUR COMPENSATION DEVICE, LENS BARREL, AND CAMERA DEVICE

BACKGROUND OF THE INVENTION

1. Field of the Invention

The present invention relates to a blur compensation device, a lens barrel, and a camera device.

2. Description of the Related Art

In recent years, there is a request such as downsizing of a blur compensation device. From this, as shown in Patent document 1, the blur compensation device has an asymmetrical shape of a movable member with respect to a center of a lens thereof. In regard to such a shape of the movable member, the center of the lens and a gravity center of the movable member hardly correspond to each other.

In conventional ways, as shown in Patent document 1, a voice coil motor (VCM) was placed so that a drive axis of the voice coil motor which drives a movable member was directed to a center of a lens. Therefore, in conventional arts, there was a problem that a rotary torque was worked around a gravity center of the movable member when the movable member was to move, so that control performances of the blur compensation device such as controlling stability or convergence properties of the movable member for a target position were adversely acted on during the blur compensation. In addition, there was a problem that a mass of the movable member increased and drive performances deteriorated in the case of using an adjusting member of the gravity center.

PRIOR ART DOCUMENT

Patent Document

[Patent Document 1]
Japanese Unexamined Patent Publication No. 2009-169359

SUMMARY OF THE INVENTION

The object of the present invention is to provide a blur compensation device with excellent control performances, a lens barrel, and a camera device comprising the blur compensation device.

To achieve the above object, the blur compensation device (100) of the present invention comprises;

a movable member (130) provided with a blur compensation member, which is relatively movable to a fixed member (140) on a predetermined drive face, for compensating an image blur formed by an optical system and having a gravity center located different from a center of the blur compensation member (L3);

a first drive member (132, 142) which moves the movable member (130) along a first axis (X') on the drive face; and a second drive member (134, 144) which moves the movable member (130) along a second axis (Y') crossing the first axis (X') on the drive face, wherein at least a part of the first drive member (132, 142) is provided on the movable member (130) and moves with the movable member (130) along the first axis (X');

at least a part of the second drive member (134, 144) is provided on the movable member (130) and moves with the movable member (130) along the second axis (Y'); and an intersection point (M) of the first axis (X') with the second axis (Y') is located nearer to the gravity center (G) of the movable member (130) than the center (O) of the blur compensation member (L3) on the drive face.

Note that, in order to easily explain the present invention, the numerals of the Figures shown in the embodiments are used. However, the present invention is not to be limited thereto. The constitution of the embodiments as stated below may be modified suitably, and at least some parts may be substituted by other constitution as well. Further, the constitutional element having no any particular limitation of its position is not limited to the position disclosed in the embodiments and the position can be changed as long as the function can be achieved.

DESCRIPTION OF THE PREFERRED EMBODIMENTS

The First Embodiment

Figure 1:
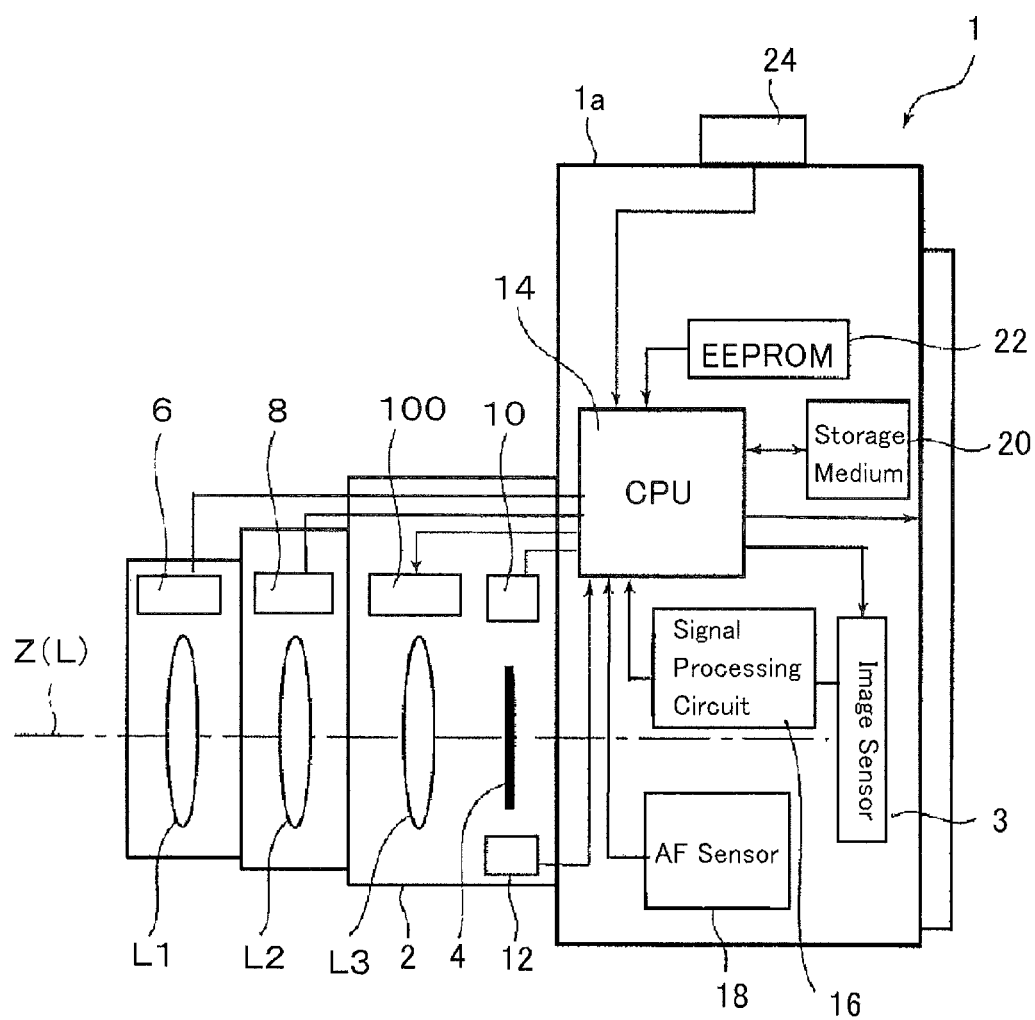
FIG. 1 is a schematic block diagram of a camera according to one embodiment of the present invention.

As shown in FIG. 1, a camera 1 according to one embodiment of the present invention is a so-called compact digital camera, and a camera body 1a and a lens barrel 2 are integrated. Note that, in the following embodiment, a compact digital camera will be described as an example, but the present invention is not limited to the compact digital camera. For example, it may be a single-lens reflex digital camera which constitutes a lens and a camera body separately. Further, it may be a mirrorless type camera which excludes a mirror mechanism. Further, it is not limited to a compact digital camera or a single-lens reflex digital camera, but it can be also applied to optical devices such as video cameras, binoculars, microscopes, telescopes, or mobile phones.

The lens barrel 2 comprises an imaging optical system constituted by arranging a first lens group L1, a second lens group L2, and a third lens group (a blur compensation lens group) L3 in order from a subject side. Further, the camera 1 of the present embodiment comprises an image sensor 3 represented by CCD or CMOS at the back of the third lens group (image surface side).

The first lens group L1 is provided at the nearest to the subject side in the imaging optical system. The first lens group L1 is movably driven by a drive mechanism 6 in the direction along the optical axis L and can ensure zooming. The second lens group L2 is movably driven by a drive mechanism 8 in the direction along the optical axis L and can ensure focusing.

The third lens group (the blur compensation lens group) L3 comprises a part of a blur compensation device 100. With the blur compensation device 100 which received a signal from a CPU 14, the blur compensation lens group L3 moves within a face crossing the optical axis L and decreases image blurs caused by the camera motion.

A diaphragm mechanism 4 is driven by a drive mechanism 10 so that camera exposure is controlled. The image sensor 3 generates an electrical image output signal based on light of the subject image formed by the imaging optical mechanism on the imaging face. The image output signal is inputted to the CPU 14 after A/D conversion or noise processing with a signal processing circuit 16.

An angle velocity sensor 12 such as gyro sensors is built in with the lens barrel 2. The angle velocity sensor 12 detects an angle velocity caused by hands movement etc. occurring to the camera 1 and outputs it to the CPU 14. A detecting signal from a AF sensor 18 is also outputted to the CPU 14. Based on the detecting signal, the drive mechanism 8 is controlled and an auto focus (AF) function is realized.

A storage medium 20, a nonvolatile memory 22, and some kind of operation button 24 etc. are connected to the CPU 14. The storage medium 20 is a memory such as an attachable card type memory which stores camera images and is read out by receiving an output signal from the CPU 14. There are several types of the attachable card type memory such as Compact Flash (a registered trademark) cards or SD cards, but it is not particularly limited.

The nonvolatile memory 22 stores information of adjusted values such as gain values of gyro sensors and is comprised of a semiconductor memory which is built in with inside of the camera with the CPU 14. For example, a release switch is exemplified as some kind of operation button 24 and a signal thereof is inputted to the CPU 14 by depressing the release switch half or completely.

Figure 2:
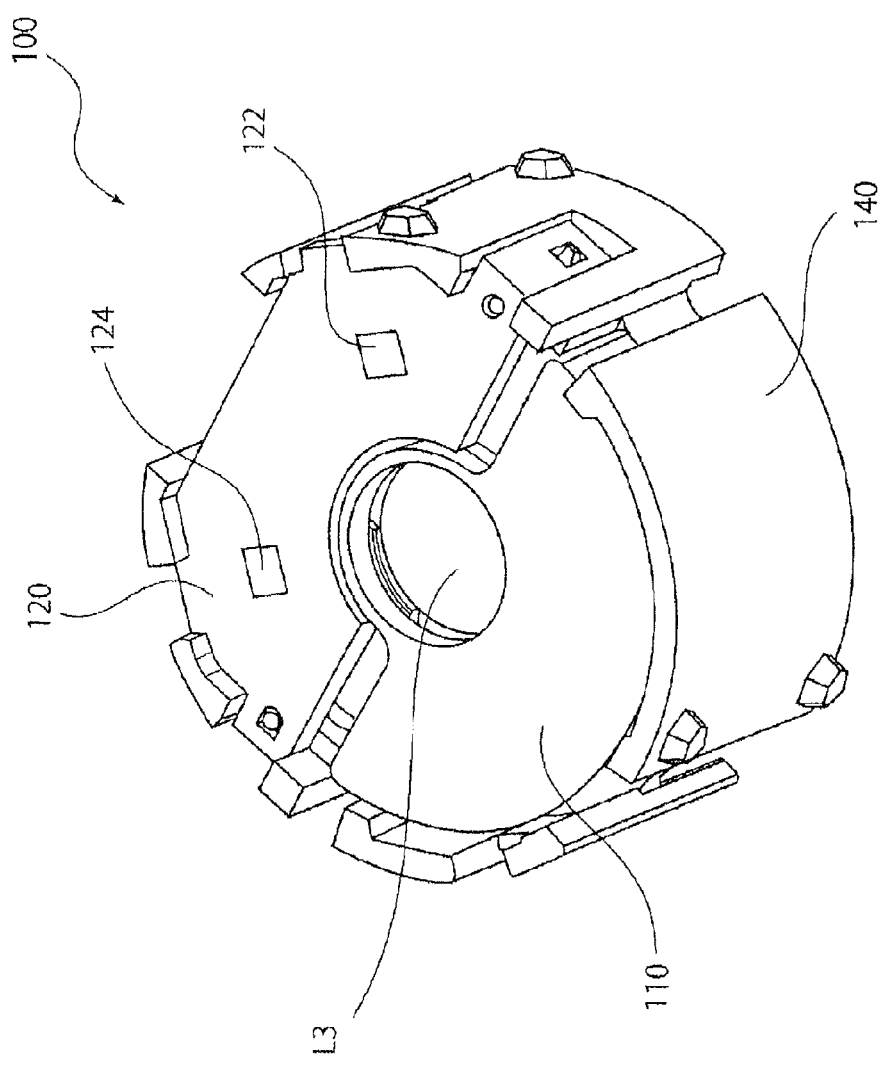
FIG. 2 is a front side perspective view of the blur compensation device shown in FIG. 1.
Figure 3:
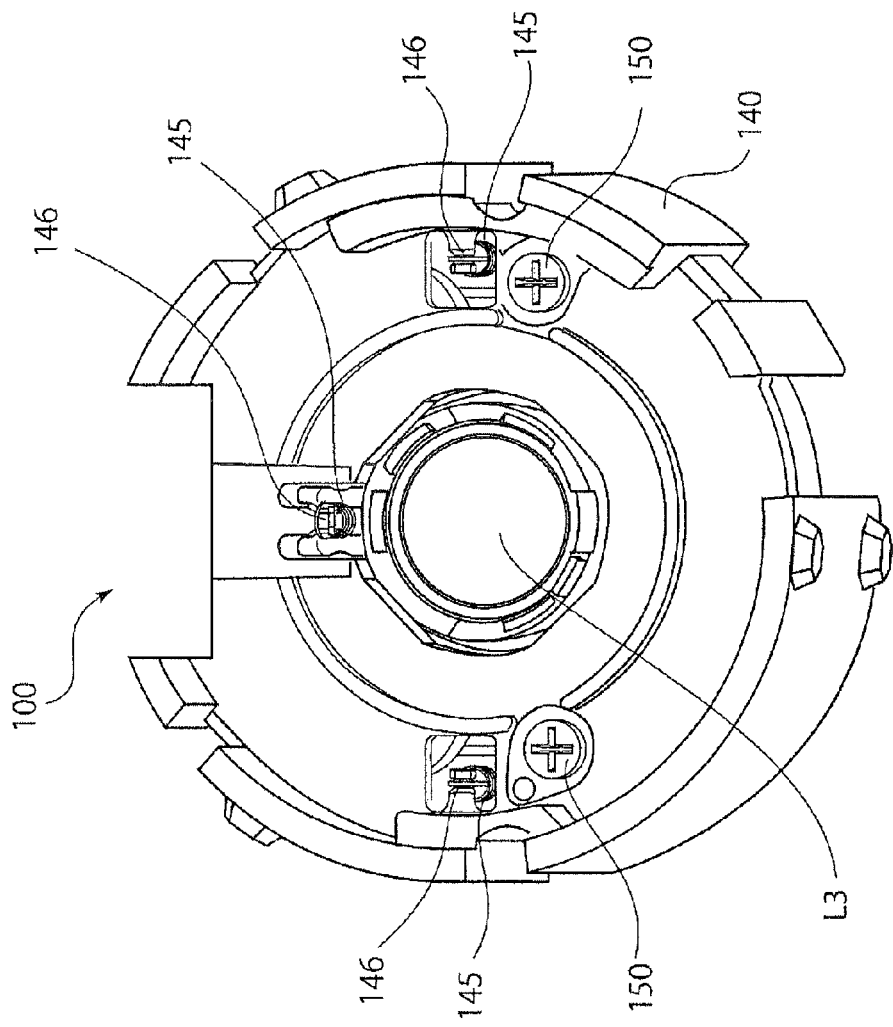
FIG. 3 is a back side perspective view of the blur compensation device shown in FIG. 2.

The constitution of the blur compensation device 100 shown in FIG. 1 will be described with FIG. 2 to FIG. 4. Note that, in the following description, an axis parallel to the optical axis L is Z-axis.

Figure 4:
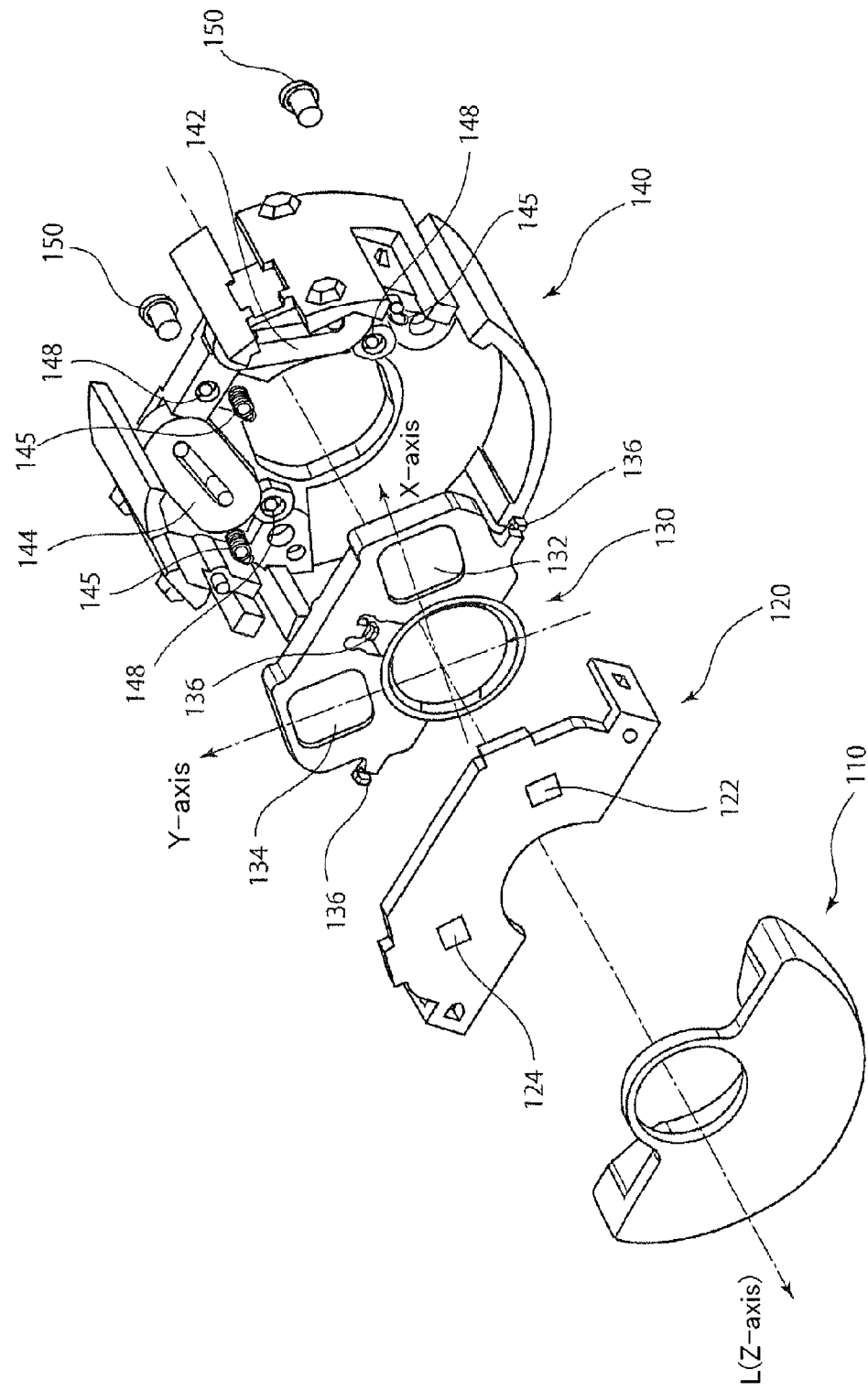
FIG. 4 is an assembly drawing of the blur compensation device shown in FIG. 2 and FIG. 3.

As shown in FIG. 4, the blur compensation device 100 comprises a movable part 130 and a fixed part 140. As shown in FIG. 2 and FIG. 4, the fixed part 140 comprises a shutter part 110 and a position detection part 120. These are fixed to the fixed part 140 at screws 150. The shutter part 110 has a constitution of controlling camera exposure and may be independent from the fixed part 140.

The position detection part 120 comprises a first hall effect element 122 and a second hall effect element 124 and detects a position of the movable part 130. The first hall effect element 122 has a detection axis on X-axis vertical to the optical axis L and the second hall effect element 124 has a detection axis on Y-axis vertical to the optical axis L.

The first hall effect element 122 and the second hall effect element 124 detect magnetic fields of a first magnet 132 and a second magnet 134 which are provided on the movable part 130 and detect the position of the movable part 130.

The movable part 130 comprises the first magnet 132, the second magnet 134, and the blur compensation lens group L3. In the following description, in order to easily understand the present embodiment, the blur compensation lens group L3 will be described as one slide of the blur compensation lens L3.

The movable part 130 is attached to the fixed part 140 at the three points by three pulling coil springs 145. The pulling coil springs 145 are attached to between a spring installation part at the side of the fixed part 146 shown in FIG. 3 and a spring installation part at the side of the movable part 136 shown in FIG. 4. By sliding among three ceramic balls 148 shown in FIG. 4, the movable part 130 relatively moves to the fixed part 140 on a face crossing the optical axis L (e.g. a face including X-axis and Y-axis and/or a face crossing the optical axis L orthogonally). Note that, the number of the pulling coil springs 145 and the ceramic balls 148 can be changed properly in accordance with shapes of the movable part 130 and the fixed part 140 and the like.

The movable part 130 moves on a face crossing the optical axis L by the driving force generated by the interaction between the first magnet 132 (the second magnet 134) provided on the movable part 130 and the first drive coil 142 (the second drive coil 144) provided on the fixed part 140. The first magnet 132 and the first drive coil 142 comprise a first VCM 152, and the second magnet 134 and the second drive coil 144 comprise a second VCM 154. VCM is an abbreviation of voice coil motors.

Figure 5:
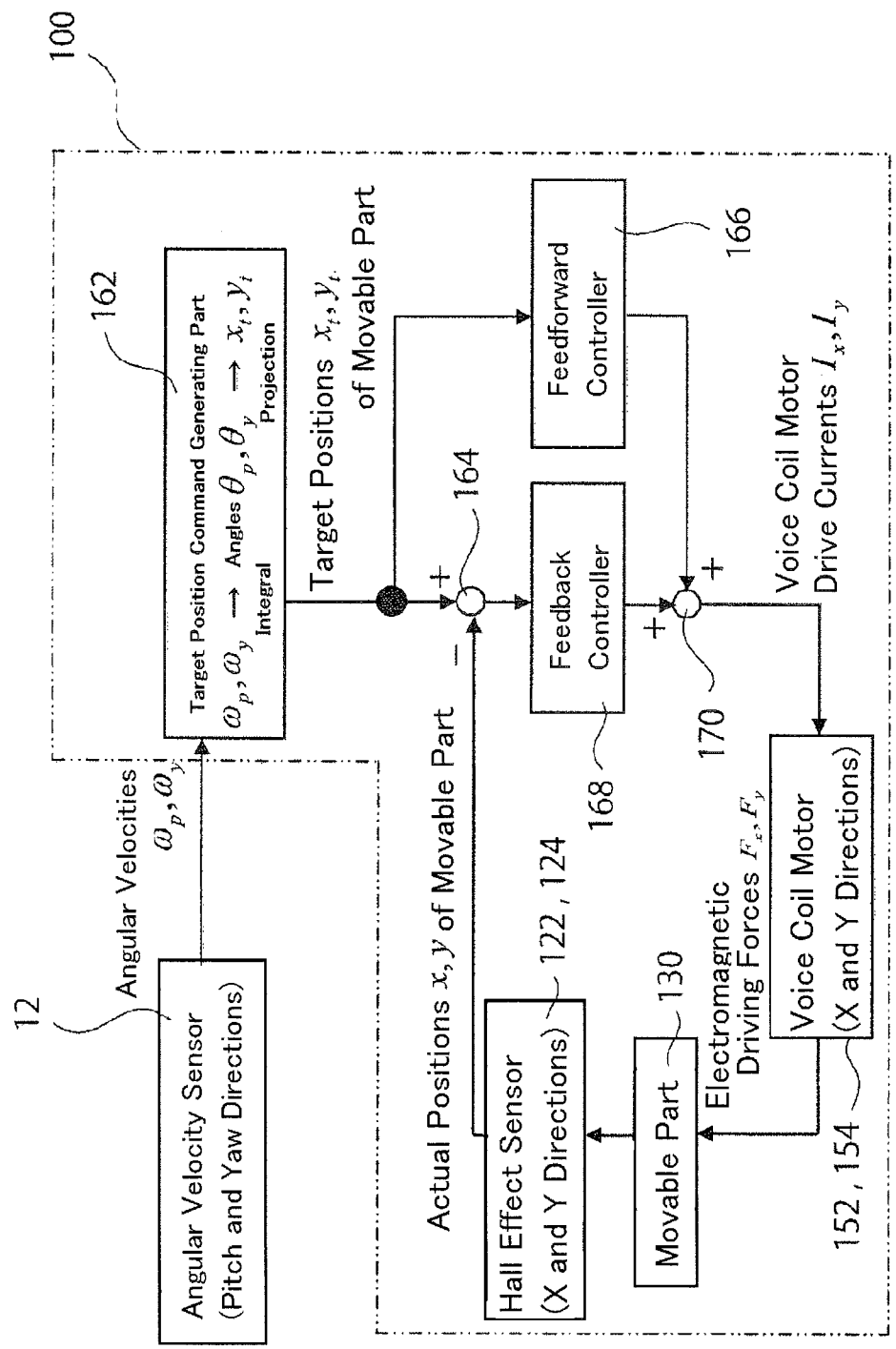
FIG. 5 is a controlling block diagram showing an example of controlling of the blur compensation operation by the camera shown in FIG. 1.

An example of a blur compensation motion by the blur compensation device 100 shown in FIGS. 1 to 4 will be shown in FIG. 5. As shown in FIG. 5, the blur compensation device 100 further comprises a target position command generating part 162, a subtracter 164, a feedforward controller 166, a feedback controller 168, and an adder 170. These constitution may be included in, for example, the CPU 14 of a camera body 1a shown in FIG. 1 or by a lens CPU (not expressed with a Figure) of the lens barrel 2.

An angle velocity sensor 12 is included in the camera 1 shown in FIG. 1. The angle velocity sensor 12 detects blur angle velocity signals $\omega_p$ and $\omega_y$ (rad/s) in the pitch direction and the yaw direction generated to the camera 1 and outputs them to the target position command generating part 162.

The target position command generating part 162 generates signals regarding movable part target position $x_t$ and $y_t$ (mm) by converting the angle velocity signals $\omega_p$ and $\omega_y$ to blur angles $\theta_p$ and $\theta_y$ (rad) by integrating them and by projecting blur angles $\theta_p$ and $\theta_y$ on a face crossing the optical axis. The signals regarding movable part target position $x_t$ and $y_t$ are signals regarding a target position of the movable part 130 for cancelling a blur due to the angle velocity signals $\omega_p$ and $\omega_y$.

By utilizing the movable part target position $x_t$ and $y_t$ and movable part position coordinates x and y (mm) from the hall effect elements 122 and 124, coil drive electric currents $I_x$ and $I_y$ (A) for driving coils 142 and 144 are generated.

Specifically, the signals regarding the movable part target position $x_t$ and $y_t$ are inputted to the adder 170 through the feedforward controller 166. Further, the signals regarding the movable part target position $x_t$ and $y_t$ and signals regarding movable parts position coordinates x and y are inputted to the adder 170 through the subtracter 164 and the feedback controller 168. By utilizing these inputted signals, the adder 170 generates the coil drive electric currents $I_x$ and $I_y$ and outputs them to the first VCM 152 (the first drive coil 142) and the second VCM 154 (the second drive coil 144).

Figure 6:
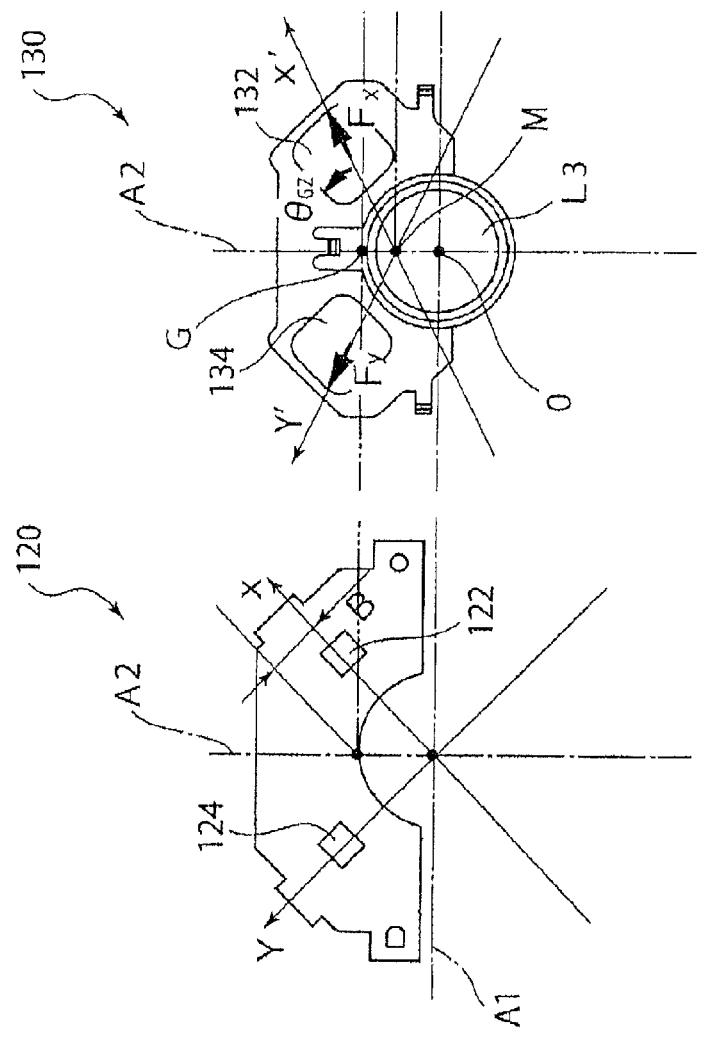
FIG. 6(a) to FIG. 6(c) show a positional relation of a detection part, a movable part, and a holding part of blur compensation device shown in FIG. 3 to FIG. 5, and a relation between detection axes of the detection part and drive axes of a VCM.

When the coil drive electric currents $I_x$ and $I_y$ are inputted to the first VCM 152 and the second VCM 154, as shown in FIG. 6, electromagnetic driving forces $F_{x'}$ and $F_{y'}$ are acted on to the movable part 130. The movable part 130 is moved to a target position on the face crossing the optical axis L by the electromagnetic driving forces $F_{x'}$ and $F_{y'}$.

The hall effect elements 122 and 124 shown in FIG. 5 detect movable parts position coordinates x and y and output them to the feedback controller 168. During blur compensation operation, blur compensation is proceeded by repeating the above control with the angle velocity sensor 12 and the blur compensation device 100.

Next, with FIG. 6, the positional relation between the movable part 130 and the fixed part 140 of the blur compensation device 100 in the present embodiment will be described in detail. In the following description, mutually vertical axes on the face of X, Y-axes vertical to the optical axis L are A1-axis and A2-axis. A1-axis and A2-axis pass the optical axis L on the face vertical thereto and are mutually vertical. The A1-axis and A2-axis divide an angle, which X-axis and Y-axis cross at the optical angle L, into the two same angles.

As shown in FIG. 6(a), the first hall effect element 122 and the second hall effect element 124 are placed on the detection part 120. The first hall effect element 122 has a detection axis in the direction of X-axis and the second hall effect element 124 has a detection axis in the direction of Y-axis. In the present embodiment, X-axis and Y-axis are mutually vertical, but they may cross at an angle which is not perpendicular.

The first hall effect element 122 detects a X-axis directional position of the first magnet 132 attached to the movable part 130 shown in FIG. 6(b) and the second hall effect element 124 detects a Y-axis directional position of the second magnet 134. The detection part 120 provided with the first hall effect element 122 and the second hall effect element 124 can thereby detect a positional coordinate along X-axis and Y-axis of the movable part 130.

In the present embodiment, as shown in FIG. 6(b), the movable part 130 has an asymmetrical shape along A1-axis. This is because, as shown in FIG. 2 and FIG. 4, from the viewpoint of downsizing of the blur compensation device 100 etc., the shutter part 110 is integrated into the blur compensation device 100 and an approximately half area of lower side of the fixed part 140 is occupied by the shutter part 110. Therefore, the gravity center G of the movable part of the movable part 130 does not exist at the center O of the lens but exist at the upper side of the center O of the lens along A2-axis. Note that, the shape of the movable part 130 may have a symmetrical shape along A1-axis and may have an asymmetrical shape along A2-axis as well.

The movable part 130 is provided with the first magnet 132 and the second magnet 134. By the interaction between the first drive coil 142 and the second drive coil 144 shown in FIG. 6(c), the electromagnetic driving forces $F_{x'}$ and $F_{y'}$ are acted on to the movable part 130. As shown in FIG. 6(c), X'-axis is inclined toward X-axis at a drive axis inclined angle $\theta$ and Y'-axis is inclined toward Y-axis at a drive axis inclined angle $\theta$. As shown in FIG. 6(b), the intersection point of X'-axis with Y'-axis is the origin M of drive axis.

By the electromagnetic driving forces $F_{x'}$ and $F_{y'}$, the movable part 130 moves relatively to the fixed part 140 along X'-axis and Y'-axis. When the movable part 130 locates at the drive axis origin M which is a driving center thereof, the center O of the lens passes the optical axis L. The first magnet 132 is placed so that the center thereof passes X'-axis and the second magnet 134 is placed so that the center thereof passes Y'-axis.

As shown in FIG. 6(c), the first drive coil 142 and the second drive coil 144 are placed on the fixed part 140. That is, the first drive coil 142 is placed on the fixed part 140, as shown in FIG. 6(c), so that X'-axis which is a drive axis of the first VCM 152 comprised of the first drive coil 142 and the first magnet 132 shown in FIG. 6(b) passes nearer to the gravity center G of the movable part than the center O of the lens. In the present embodiment, the first drive coil 142 is placed so that the VCM drive axis X' is inclined toward the hall effect element detection axis X at the drive axis inclined angle $\theta$ (deg).

Further, the second drive coil 144 is placed on the fixed part 140 so that Y'-axis which is the drive axis of the second VCM 154 comprised of the second drive coil 144 and the second magnet 134 passes nearer to the gravity center G of the movable part than the center O of the lens. That is, the second drive coil 144 is placed so that the VCM drive axis Y' is inclined toward the hall effect element detection axis Y at the drive axis inclined angle $\theta$ (deg). Note that, the inclined angle of X'-axis toward X-axis and the inclined angle of Y'-axis toward Y-axis may be different. Further, by changing a placement position of coils 142 and 144 on the fixed portion 140, the placement position may be adjusted so that X'-axis and Y'-axis pass nearer to the gravity center G of the movable part than the center O of the lens.

In the present embodiment, since the first drive coil 142 and the second drive coil 144 are placed as the above, the drive axis origin M which is an intersection point of the drive axis X' with the drive axis Y' exists nearer to the gravity center G of the movable part than the center O of the lens along A2-axis. The drive axis origin M preferably corresponds to the gravity center G of the movable part. In this case, the drive axis X' and the drive axis Y' cross at an angle of $\theta_0$ which is not perpendicular and the angle of $\theta_0$ is an obtuse angle (e.g. an angle of 91-degrees to 120-degrees) in the present embodiment.

Figure 7:
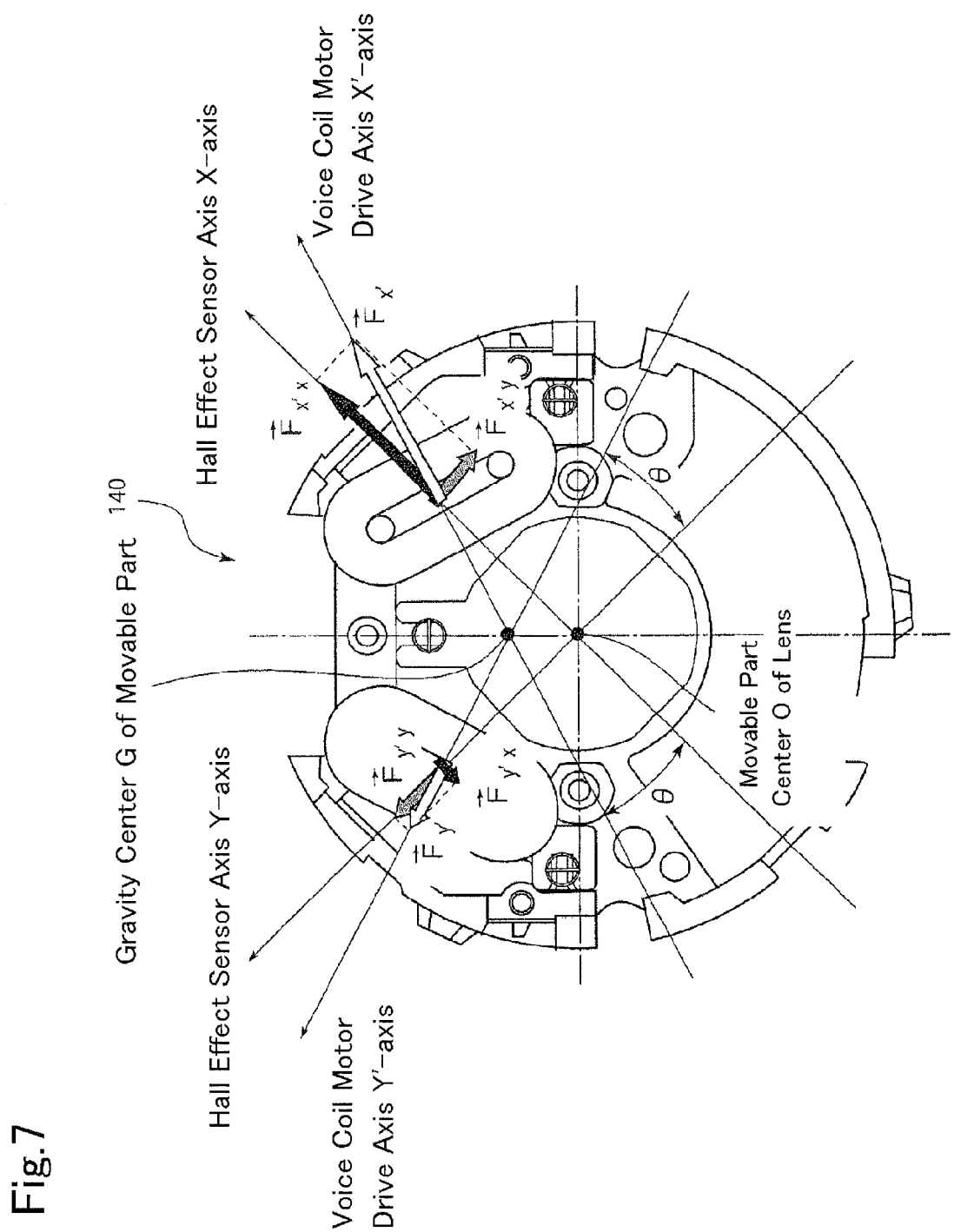
FIG. 7 shows a relation between the detection axes of the detection part and the drive axes of the VCM when the movable part is moved along the X-axis.

As the above, in the present embodiment, as shown in FIG. 6, the VCM drive axes X' and Y' are inclined toward the hall effect element detect axes X and Y at the drive axis inclined angle $\theta$. Therefore, as shown in FIG. 7, which is a case that the drive axis origin M corresponds to the gravity center G of the movable part, when a driving force $F_{x'}$ is acted on along the drive axis of the first VCM 152, the driving force $F_{x'}$ is vectorially resolved to a driving force $F_{x'x}$ of X-axis directional component and a driving force $F_{x'y}$ of Y-axis directional component of the hall effect element detection axes. The driving force $F_{x'x}$ of X-axis directional component is used as a driving force for a target position $x_t$ of the movable part shown in FIG. 5, while the driving force $F_{x'y'}$ of Y-axis directional component adversely acts on convergence to a target position $y_t$ of the movable part.

In this case, the driving force $F_{x'y'}$ is canceled by acting a driving force $F_{y'}$ on Y'-axis with the second VCM 154. That is, the driving force $F_{x'y'}$ is canceled by a driving force $F_{y'y'}$ of Y-axis directional component of the driving force $F_{y'}$. In this case, the following relation is held between the driving force $F_{x'y'}$ and the driving force $F_{y'y'}$.

[Numerical Formula 1]

$$F_{x'y'} - F_{y'y'} = 0 \qquad \text{(numerical formula 1)}$$

Note that, since a driving force $F_{y'x}$ is also acted on in accordance with action of the driving force $F_{y'}$, a driving force to the target position $x_t$ of the movable part is eventually $F_{x'x} - F_{y'x}$. The following relations are held when the directions of the VCM drive axes X' and Y' shown in FIG. 7 are regarded as positive and magnitudes of them are regarded as scalar quantities $f_{x'}$ and $f_{y'}$.

[Numerical Formula 2]

$$F_{x'x} = f_{x'} \cos \theta \cdot i, \; _{x'y'} = f_{x'} \sin \theta \cdot j \qquad \text{(numerical formula 2)}$$

[Numerical Formula 3]

$$F_{y'x} = f_{y'} \sin \theta \cdot i, \; F_{y'y'} = f_{y'} \cos \theta \cdot j \qquad \text{(numerical formula 3)}$$

Here, in the numerical formula 2 and the numerical formula 3, i and j are unit vectors in the directions of X-axis and Y-axis, respectively. When the numerical formula 2 and the numerical formula 3 are substituted in the numerical formula 1, the following numerical formula 4 is to be obtained.

[Numerical Formula 4]

$$f_{x'} \sin \theta = f_{y'} \cos \theta \therefore f_{y'} = f_{x'} \tan \theta \qquad \text{(numerical formula 4)}$$

From the above, the target driving force $F_x$ of X-axis direction to the target position $x_t$ of the movable part is represented by the numerical formula 5.

[numerical formula 5]

$$\begin{aligned} F_x &= F_{x'x} - F_{y'x} & \text{(numerical formula 5)} \\ &= (f_{x'} \cos\theta - f_{y'} \sin\theta) \cdot i \\ &= f_{x'} \left( \cos\theta - \frac{\sin^2\theta}{\cos\theta} \right) \cdot i \\ &= f_{x'} \frac{\cos 2\theta}{\cos\theta} \cdot i \end{aligned}$$

Here, the following numerical formula 6 is obtained when the X and Y axial directions of the hall effect element detection axes shown in FIG. 7 are regarded as positive and magnitudes of them are regarded as scalar quantities $f_x$ and $f_y$.

[numerical formula 6]

$$f_x = f_{x'} \frac{\cos 2\theta}{\cos\theta} \therefore f_{x'} = f_x \frac{\cos\theta}{\cos 2\theta} \qquad \text{(numerical formula 6)}$$

When the numerical formula 6 is substituted in the numerical formula 4, the numerical formula 7 is obtained.

[numerical formula 7]

$$f_{y'} = f_x \frac{\sin\theta}{\cos 2\theta} \qquad \text{(numerical formula 7)}$$

Figure 8:
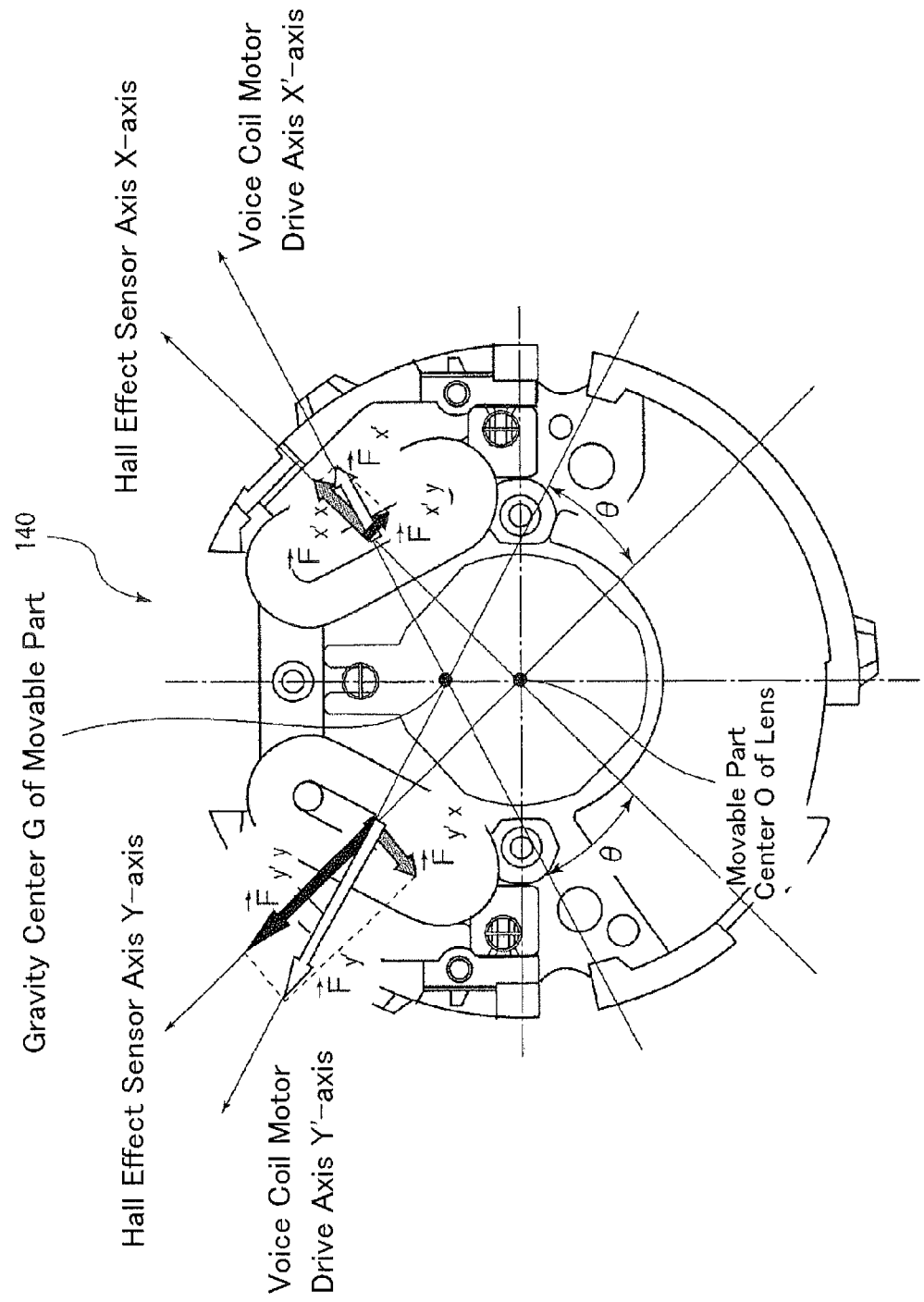
FIG. 8 shows a relation between the detection axes of the detection part and the drive axes of the VCM when the movable part is moved along Y-axis.

Further, as shown in FIG. 8, the following numerical formula 8 is obtained in the same way as the above when the movable part 130 is converged to the target position of the movable part $y_t$ by acting the driving force $F_{y'}$ on the movable part 130 along the drive axis Y' of the second VCM 154.

[numerical formula 8]

$$f_{x'} = f_y \frac{\sin\theta}{\cos 2\theta} \qquad \text{(numerical formula 8)}$$

By composing the numerical formula 6 and numerical formula 8, the driving force $F_{x'}$ of the first VCM 152 on X'-axis is represented by the following numerical formula 9-1 by means of the driving forces $F_x$ and $F_y$ in the X and Y direction of the hall effect element detection axis.

[numerical formula 9-1]

$$f_{x'} = f_x \frac{\cos\theta}{\cos 2\theta} + f_y \frac{\sin\theta}{\cos 2\theta} \qquad \text{(numerical formula 9-1)}$$

The numerical formula 9-1 is represented by the following numerical formula 9-2 by means of $F_{x'}$, $F_x$, and $F_y$.

[numerical formula 9-2]

$$F_{x'} = F_x \frac{\cos\theta}{\cos 2\theta} + F_y \frac{\sin\theta}{\cos 2\theta} \qquad \text{(numerical formula 9-2)}$$

In the same way, the driving force $F_{y'}$ of the VCM on Y'-axis is represented by the following numerical formula 10-1.

[numerical formula 10-1]

$$f_{y'} = f_x \frac{\sin\theta}{\cos 2\theta} + f_y \frac{\cos\theta}{\cos 2\theta} \qquad \text{(numerical formula 10-1)}$$

The numerical formula 10-1 is represented by the following numerical formula 10-2 by means of $F_{y'}$, $F_x$, and $F_y$.

[numerical formula 10-2]

$$F_{y'} = F_x \frac{\sin\theta}{\cos 2\theta} + F_y \frac{\cos\theta}{\cos 2\theta} \qquad \text{(numerical formula 10-2)}$$

By driving the VCM with vector conversions of the numerical formula 9-1 and the numerical formula 10-1, the consistency between the detection axes of the hall effect element and the drive axes of the VCM is preserved.

Next, the blur compensation device 100 of the present embodiment is dynamically modeled and control performances of the blur compensation device will be described. Hereinafter, in order to easily understand the present embodiment, control in the X-axis direction will only be described. Since control in the Y-axis direction is the same as control in the X-axis direction, control in the Y-axis direction will be omitted.

In FIG. 6, a displacement of the movable part 130 in the x-direction is x (mm), a rotation angle around Z-axis passing the gravity center G of the movable part is $\theta_{GZ}$ (rad), the mass of the movable part 130 is m (kg), the moment of inertia around Z-axis passing the gravity center G of the movable part is $J_{GZ}$ (kg·mm²), a driving force in the X-axial direction from the VCM 142 is $f_X$ (N), a gap of the gravity center (the distance between the drive axis origin M and the gravity center G of the movable part) is $\delta$ (mm), a gap between the gravity center and the hall effect element 122 is B (mm), a composed spring constant in X-direction by the pulling coil springs 145 is $k_x$ (N/m), a composed viscosity coefficient in X-direction therewith is $c_x$ (N·s/m), and a gap between the gravity center and a composed spring element in X-direction is l (mm).

When each of physical quantity is set as the above, a motion of the movable part 130 along x-axial direction is represented by an equation of motion as shown in the following numerical formula 11 and numerical formula 12. An equation of motion regarding translation of the position of the gravity center of the movable part 130 is represented by the numerical formula 11 and an equation of motion regarding rotation of the position of the gravity center of the movable part 130 is represented by the numerical formula 12.

[Numerical Formula 11]

$$m\ddot{x} + c_x\dot{x} + k_x x = f_x \quad \text{(numerical formula 11)}$$

[Numerical Formula 12]

$$J_{Gz}\ddot{\theta}_{Gz} + c_x l \dot{\theta}_{Gz} + k_x l^2 \theta_{Gz} = f_x \delta \quad \text{(numerical formula 12)}$$

When the above equations of motion shown by the numerical formula 11 and the numerical formula 12 are Laplace transformed, the following numerical formula 13 and numerical formula 14 are obtained.

[numerical formula 13]

$$X(s) = \frac{f_x(s)}{ms^2 + c_x s + k_x} \quad \text{(numerical formula 13)}$$

[numerical formula 14]

$$\Theta(s) = \frac{f_x(s)\delta}{J_{Gz}s^2 + c_x l s + k_x l^2} \quad \text{(numerical formula 14)}$$

A displacement $X_{Sensor}(s)$ (mm) in the X-axial direction which the hall effect element detects is represented by a numerical formula 15 from the above numerical formula 13 and numerical formula 14.

[numerical formula 15]

$$X_{Sensor}(s) = X(s) + \Theta(s)B \quad \text{(numerical formula 15)}$$
$$= \frac{f_x(s)}{ms^2 + c_x s + k_x} + \frac{f_x(s)\delta B}{J_{Gz}s^2 + c_x l s + k_x l^2}$$

Here, when an acceleration in the X-axial direction which acts on the movable part is $a_x$ (mm/s2), $f_s(s)$ is represented by a numerical formula 16.

[Numerical Formula 16]

$$f_x(s) = m a_x(s) \quad \text{(numerical formula 16)}$$

When the numerical formula 16 is substituted in the numerical formula 15, the following transfer function, wherein input is the acceleration $a_x$ in the X-axial direction and output is the displacement $X_{Sensor}$ in the X-axial direction detected by the hall effect element, is obtained.

[numerical formula 17]

$$\frac{X_{Sensor}(s)}{a_x(s)} = \frac{1}{s^2 + 2\zeta_m \omega_m s + \omega_m^2} + \left(\frac{m\delta B}{J_{Gz}}\right) \cdot \frac{1}{s^2 + 2\zeta_J \omega_J s + \omega_J^2} \quad \text{(numerical formula 17)}$$

Here, $\omega_m$ and $\omega_J$ represent natural angular frequencies (rad/s) in the translation direction (X-axial direction) and the rotation direction (rotation around the Z-axial direction passing the gravity center G of the movable part), respectively. $\zeta_m$ and $\zeta_J$ represent damping ratios (-) (dimensionless numbers) of the translation direction and the rotation direction, respectively.

In the transfer function shown by the numerical formula 17, the first paragraph represents a transfer function in the translation direction and the second paragraph represents a transfer function in the rotation direction. In the control block diagram of FIG. 5, the transfer function represents a transfer function from the movable part to the hall effect element and does not include control parts or the VCM parts.

In the numerical formula 17, "$m\delta B/J_{GZ}$" is an important parameter in discussing the control performances of the blur compensation device according to the present invention. This is defined as KK factor and represented by a numerical formula 18.

[numerical formula 18]

$$KK = \frac{m\delta B}{J_{Gz}} \quad \text{(numerical formula 18)}$$

Here, to easily understand the control performances of the blur compensation device, it is hypothetically set that the resonance frequencies and damping ratios in the translation direction and rotation direction are equal as shown in the numerical formula 19, and a transfer function represented by a numerical formula 20 is obtained from the transfer function represented by the numerical formula 17.

[numerical formula 19]

$$\omega = \omega_m = \omega_J \;,\; \zeta = \zeta_m = \zeta_J \quad \text{(numerical formula 19)}$$

[numerical formula 20]

$$\frac{X_{Sensor}(s)}{a_x(s)} = \frac{1 + KK}{s^2 + 2\zeta\omega \cdot s + \omega^2} \quad \text{(numerical formula 20)}$$

As is evidenced by the numerical formula 20, when a value of KK factor is −1 or less, the transfer function represented by the numerical formula 20 is negative over the entire frequency band. Therefore, this case is out of control because feedback is a positive feedback.

When a value of KK factor is larger than −1 and less than 0, the transfer function represented by the numerical formula 20 is positive. However, in the transfer function represented by the numerical formula 17 in which a translation element and a rotation element are divided, the rotation element is negative. Therefore, in this case, it is understood that behavior of the rotation element is unstable.

When a value of KK factor is 0 or larger, the transfer function represented by the numerical formula 20 is positive and the rotation element of the transfer function represented by the numerical formula 17 is positive. Therefore, behavior of the rotation element is stable.

As the above, control is stable when a value of KK factor is positive and conversely, control is unstable when a value of KK factor is negative. Therefore, polarity of KK factor is closely related to control performances.

As shown by the numerical formula 18, polarity of KK factor is determined by a relation between the direction of the gap δ between the gravity center and the driving force $F_x$ and the direction of the gap B between the gravity center and the hall effect element position. That is, in FIG. 6(*b*) and FIG. 6(*c*), when X-axis and X'-axis are out of alignment in the same direction toward the gravity center G of the movable part, a value of KK factor is positive and the transfer function regarding the blur compensation part 100 is stable.

In the present embodiment, as the above, the first VCM 152 and the second VCM 154 are placed so that the drive axis origin M shown in FIGS. 6(*a*) to 6(*c*) exists nearer to the gravity center G of the movable part than the center O of the lens, and that the intersection point of X-axis with Y-axis and the drive axis origin M are out of alignment in the same direction toward the gravity center G of the movable part. In this case, the drive axis origin M exists between the center O of the lens and the gravity center G of the movable part.

Figure 9:
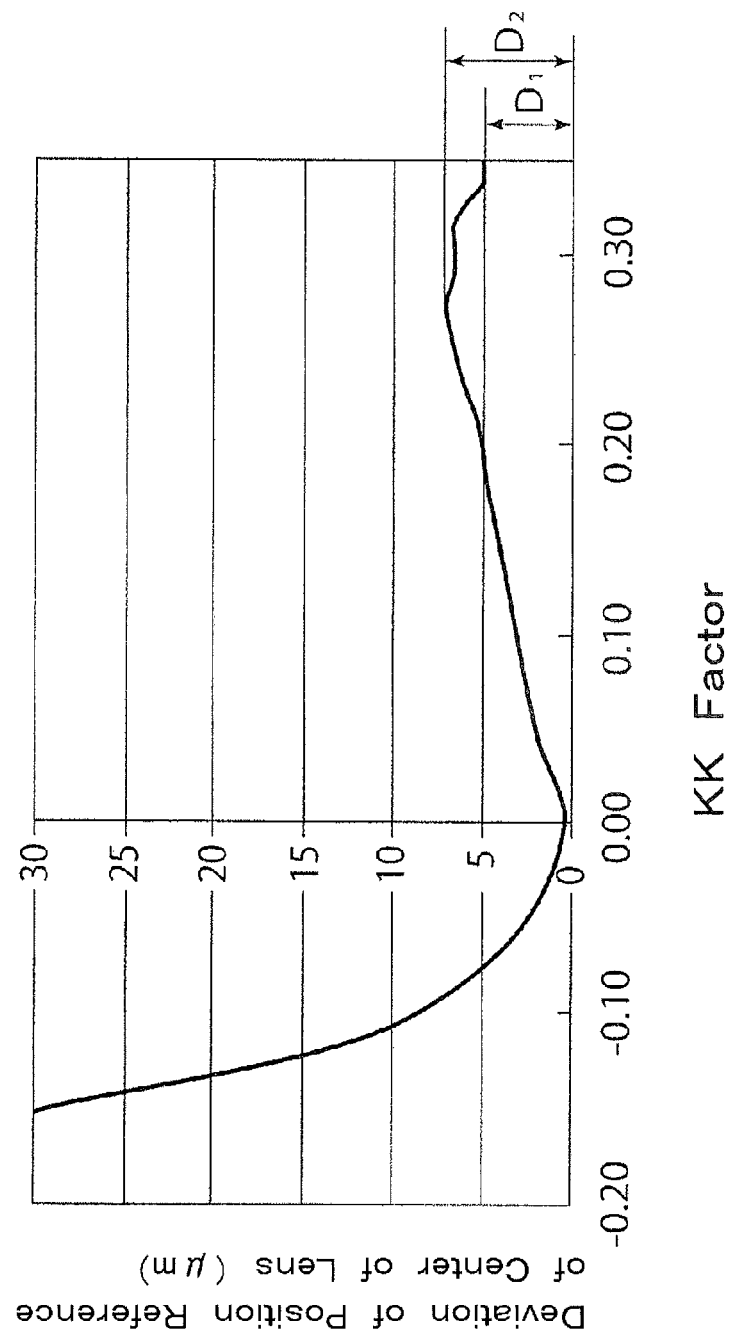
FIG. 9 is a graph showing a relation between KK factor and stationary deviation regarding a moving amount of the movable part.

FIG. 9 shows a relation of a deviation of a position reference of the center of the lens in response to values of KK factor after a predetermined period of time regarding a displacement of the movable part in a step response. As shown in FIG. 9, the deviation is small and control performances are excellent in the area whose values of KK factor are close to 0, and the deviation is large and control performances are poor in the area whose values of KK factor are negative. In the present embodiment, KK factor is set so that it is in a positive area and the value of the deviation is D1 or less. Here, the deviation D1 is a 70% value of a maximum peak value D2 of the deviation. Therefore, the value of KK factor in the present embodiment is 0 or larger and 0.2 or less.

In the present embodiment, as the above, in FIG. 6(*c*), the distance δ between the drive axis origin M and the gravity center G of the movable part and the value of KK factor are controlled by adjusting the drive axis inclined angle θ. That is, the drive axis inclined angle θ is adjusted so that the drive axis origin M is located nearer to the gravity center G of the movable part than the center O of the lens and/or the value of KK factor is 0 or larger and 0.2 or less.

Figure 10:
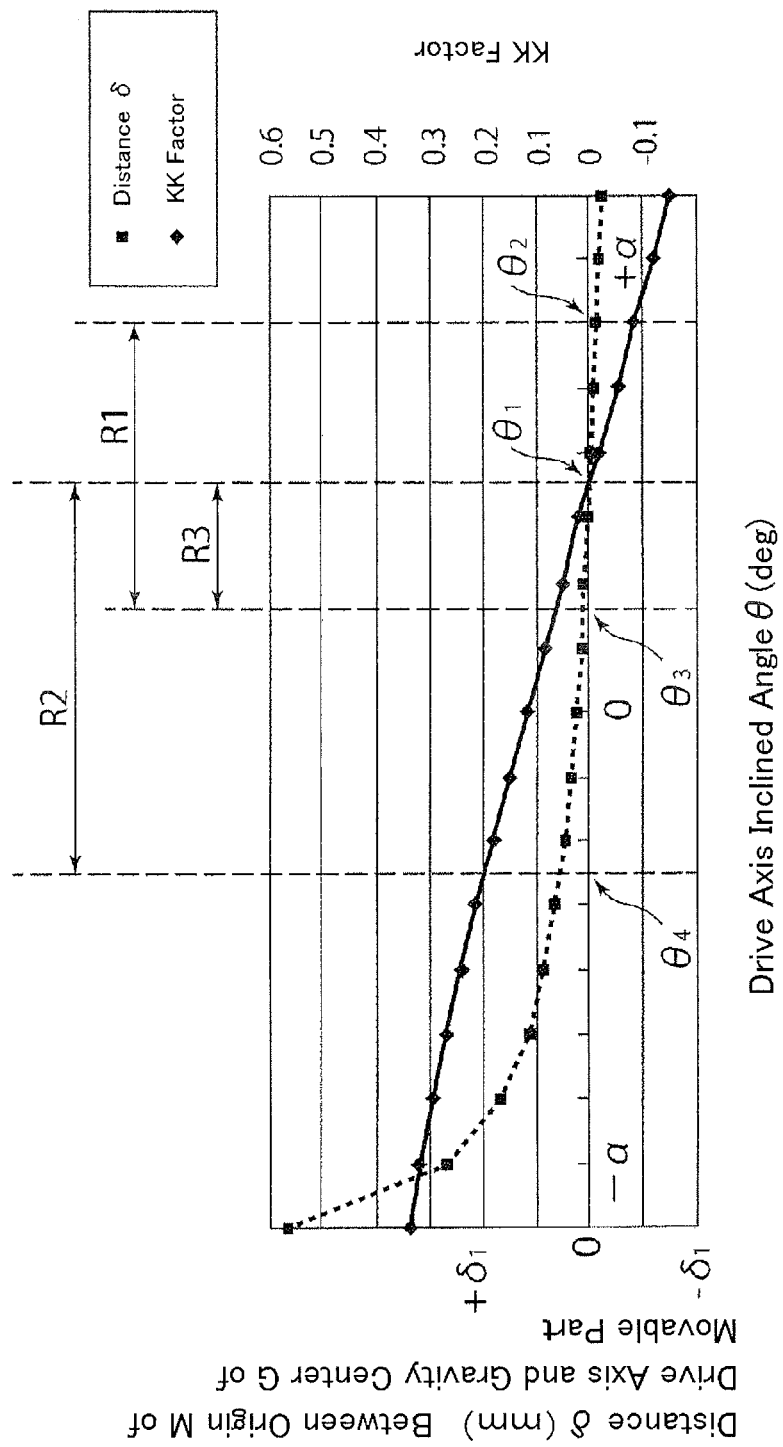
FIG. 10 is a graph showing a relation between KK factor for an inclined angle of the drive axis of the VCM and the distance between a gravity center of a movable part and an origin of the VCM drive axes.

FIG. 10 shows a relation between the drive axis inclined angle θ and the distance δ (and KK factor). In FIG. 10, the horizontal axis is a drive axis inclined angle θ (deg), the vertical axis on the left side is a distance δ (mm), the vertical axis on the right side is KK factor, the distance δ is represented by plots of a black square shape, and KK factor is represented by plots of a black diamond shape. As shown in FIG. 10, the distance δ and KK factor vary at the drive axis inclined angle θ of −α to +α.

The distance δ is 0 when the drive axis inclined angle θ is $θ_1$. At this time, in FIG. 6, the drive axis origin M corresponds to the gravity center G of the movable part. In the range R1 ($θ_3 ≤ θ ≤ θ_2$) including an angle $θ_1$ shown in FIG. 10, the drive axis origin M exists nearer to the gravity center G of the movable part than the center O of the lens. By adjusting the drive axis inclined angle θ so that the drive axis origin M is near to the gravity center G of the movable part, a rotation component in the movement of the movable part can be suppressed.

Further, KK factor is 0 or larger when the drive axis inclined angle θ is $θ_1$ or less and KK factor is 0.2 or less when the drive axis inclined angle θ is $θ_4$ or larger. That is, KK factor is 0 or larger and 0.2 or less in the range R2 ($θ_4 ≤ θ ≤ θ_1$). By adjusting the drive axis inclined angle θ so that KK factor is 0 or larger and 0.2 or less, a stable control can be performed in the movement of the movable part.

In the present embodiment, the drive axis inclined angle θ is preferably adjusted in the range R3 ($θ_3 ≤ θ ≤ θ_1$) which satisfies the condition of the range R1 and the condition of the range R2. This is because, by adjusting the drive axis inclined angle θ in the range R3, a rotation component can be suppressed and a stable control can be performed in the movement of the movable part.

Note that, more preferably, the drive axis inclined angle θ is adjusted to $θ_1$ so that the distance δ between the drive axis origin M and the gravity center G of the movable part is close to 0 and KK factor is positive (in this case, as is evidenced by the numerical formula 18, the value of KK factor is also close to 0) in the above-mentioned range R3. In this way, by adjusting the drive axis inclined angle θ, a rotation component can be suppressed and a stable control can be performed more preferably.

In the present embodiment, as shown in FIG. 6, the drive axis origin M which is an intersection point of X'-axis that is a drive axis of the first VCM 152 with Y'-axis that is a drive axis of the second VCM 154 is placed nearer to the gravity center G of the movable part 130 than the center O of the lens of the blur compensation optical member L3. Therefore, since the drive axis origin M of the movable part 130 can be close to the gravity center G of the movable part 130, a rotation component which is a harmful effect in the movement of the movable part 130 can be suppressed and a translation component which is effective for the movement of the movable part 130 can be efficiently functioned. The drive axis origin M preferably corresponds to the gravity center G of the movable part and the effect of the rotation component can be completely removed in this case. Therefore, in the present embodiment, convergence properties of the movable part 130 into the target position and control stability of the movable part 130 and the like can be improved, and control performances of the blur compensation device 100 can be improved. Further, since the effect of the rotation component can be completely removed without using an adjusting member of the gravity center etc., drive performances can be maintained without increasing the mass of the movable part.

Figure 11:
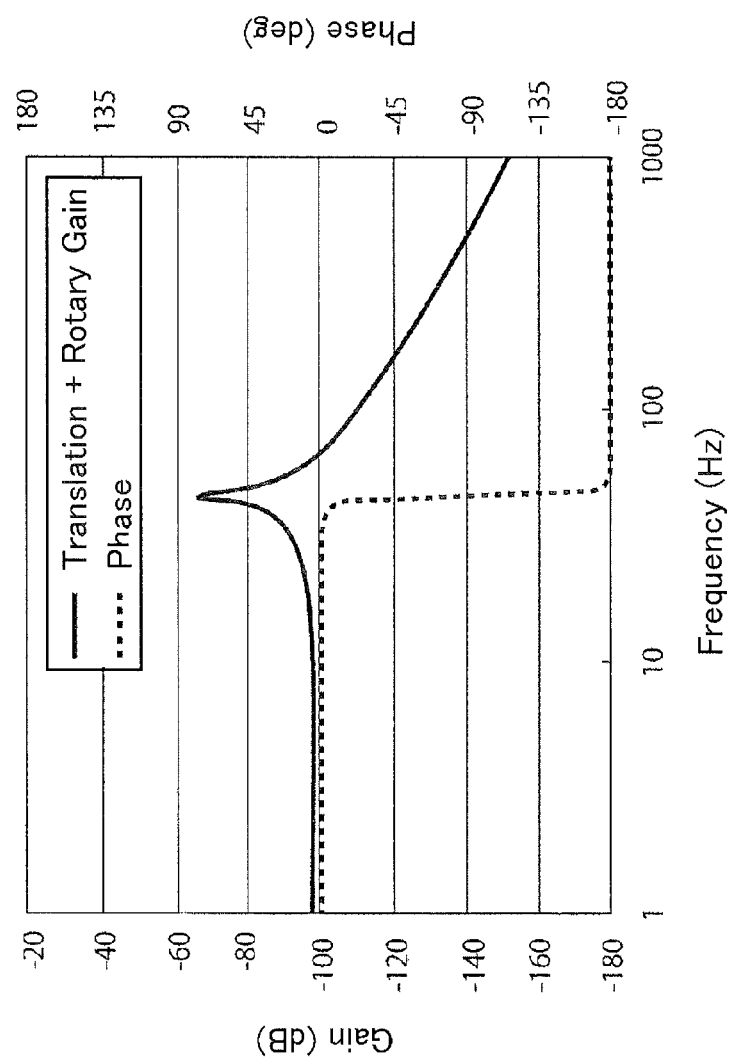
FIG. 11 is a diagram of frequency response of the blur compensation device according to the present invention.
Figure 15:
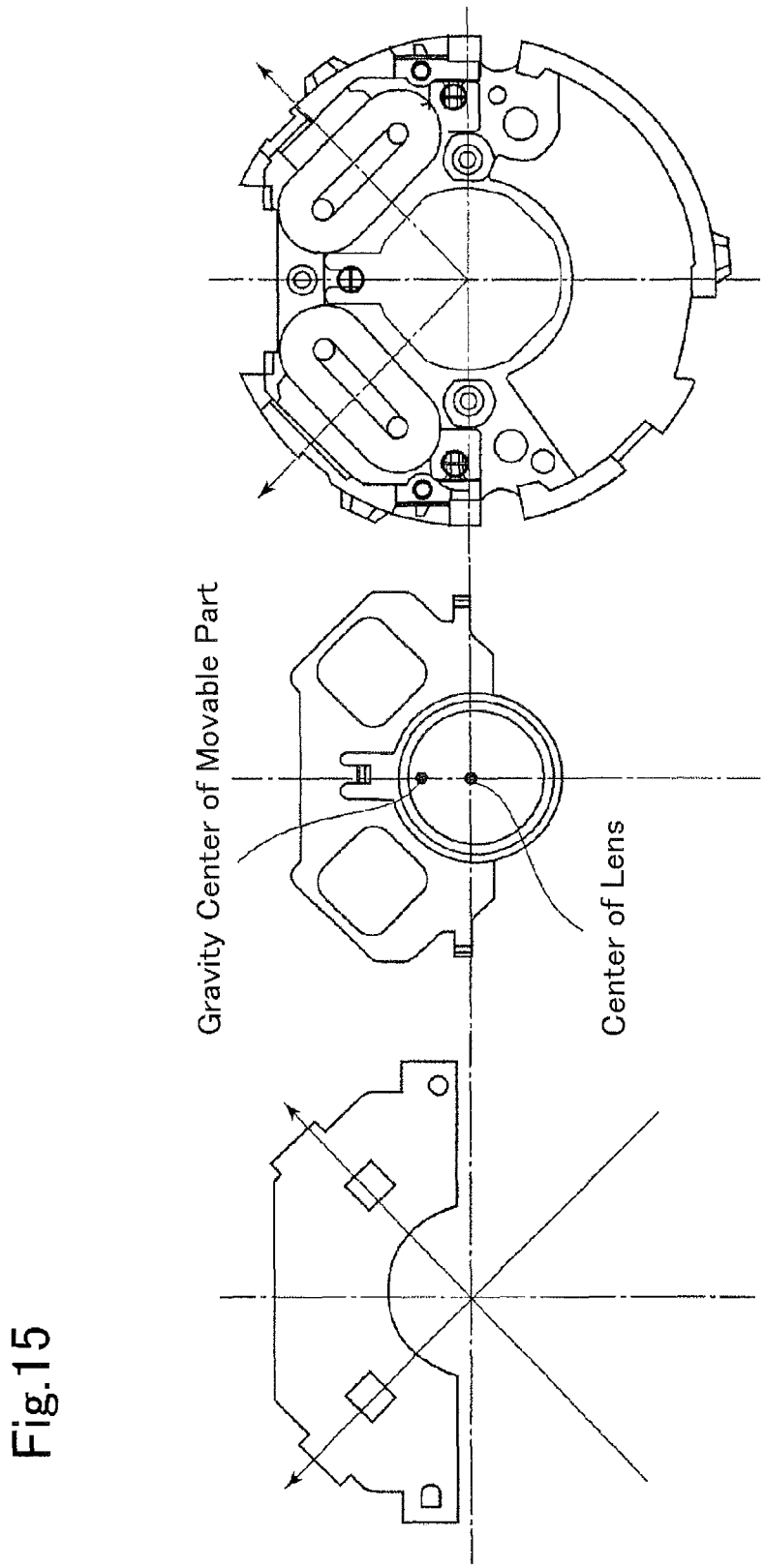
FIG. 15 shows a positional relation of a detection part, a movable part and a holding part, and a relation between the detection axes of the detection part and the drive axes of the VCM in a blur compensation device according to the conventional arts.
Figure 16:
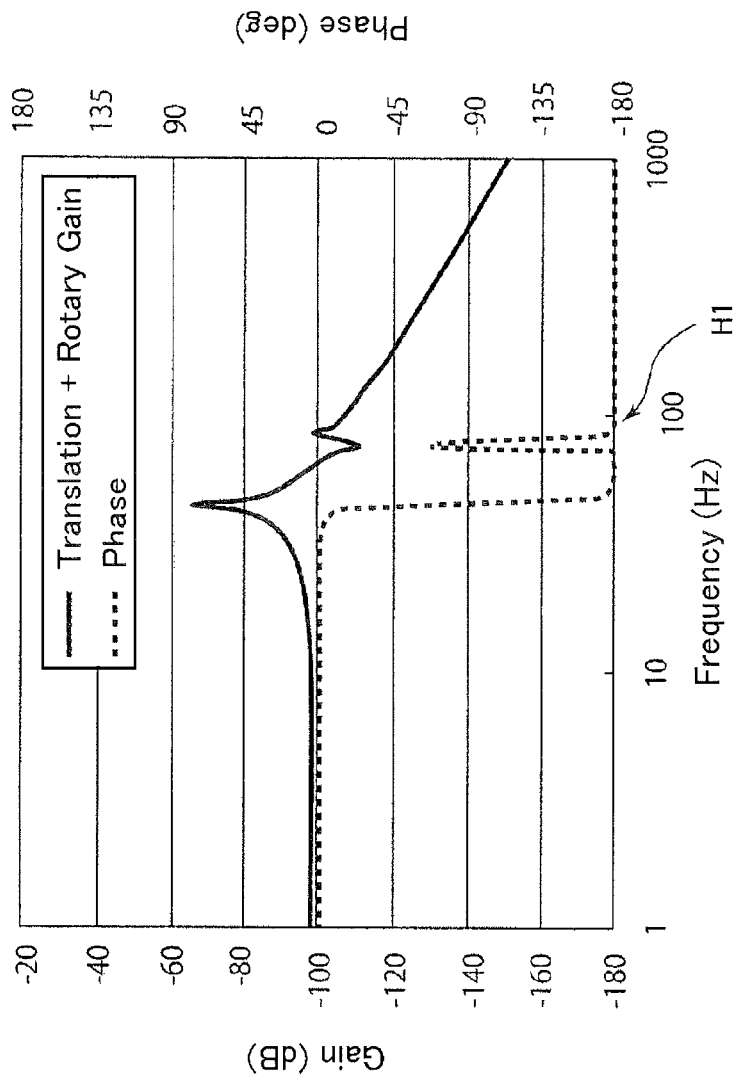
FIG. 16 is a diagram of frequency response of the blur compensation device according to the conventional arts.

The control performances of the blur compensation part 100 according to the present embodiment is shown in FIG. 11 and they will be compared with the control performances of the conventional art (FIG. 15) shown in FIG. 16. FIG. 11 and FIG. 16 show board diagrams representing gain/phase of outputting toward inputting. The inputting is an acceleration acted by an electromagnetic driving force which drives the movable part and the outputting is a position of gravity center of the movable part.

As shown in FIG. 16, the conventional art shown in FIG. 15 has a resonance component at a frequency $H_1$ (Hz). This is because, in the conventional art shown in FIG. 15, the drive axis of the VCM is placed toward the center of the lens and a rotation torque around the gravity center of the movable part is generating.

On the other hand, in the present embodiment, as the above, since the drive axis of the VCM is directed to a position which is near to the gravity center of the movable part, the rotation torque around the gravity center of the movable part is remarkably small. Therefore, in the present embodiment, as shown FIG. 11, the resonance component does not occur.

Further, in the present embodiment, as shown in FIGS. 6(a) to 6(c), the first hall effect element 122 is located at a position including an intersection point of X-axis with X'-axis and the second hall effect element 124 is located at a position including an intersection point of Y-axis with Y'-axis. Preferably, the center of the first hall effect element 122 is placed at the intersection point of X-axis with X'-axis and the center of the second hall effect element 124 is placed at the intersection point of Y-axis with Y'-axis. Therefore, it is possible to share a magnet with the drive part and the detection part and both a detection property by the detection part and a drive property by the drive part can be improved as well. Further, when the center O of the lens of the movable part 130 passes the optical axis L, both the first hall effect element 122 and the second hall effect element 124 output a positional information corresponding to 0.

In the present embodiment, as shown in FIG. 6, the drive axis origin M exists between the center O of the lens and the gravity center G of the movable part. The value of KK factor regarding the transfer function of the blur compensation device is thereby positive. Therefore, the blur compensation device according to the present invention can be controlled stably.

In the present embodiment, as shown in FIG. 5, since the movable part 130 is controlled by utilizing blur angular velocity signals ωp and ωy detected by the blur detection part 12 and the movable part position coordinates x and y detected by the first hall effect element 122 and the second hall effect element 124, the movable part 130 can be converged at the acute target position.

In the present embodiment, since the movable part 130 is moved by converting the target position coordinates along the detection axes X and Y of the first hall effect element 122 and the second hall effect element 124 into the target movement along the drive axes X' and Y' of the movable part 130, the blur compensation device can be preferably controlled.

The Second Embodiment

The second embodiment of the present invention is the same as the first embodiment except that the arrangement of the blur compensation device 100 toward the gravity direction is different from that of the first embodiment. In the following description, some part overlapped by the above embodiment will be omitted.

Figure 12:
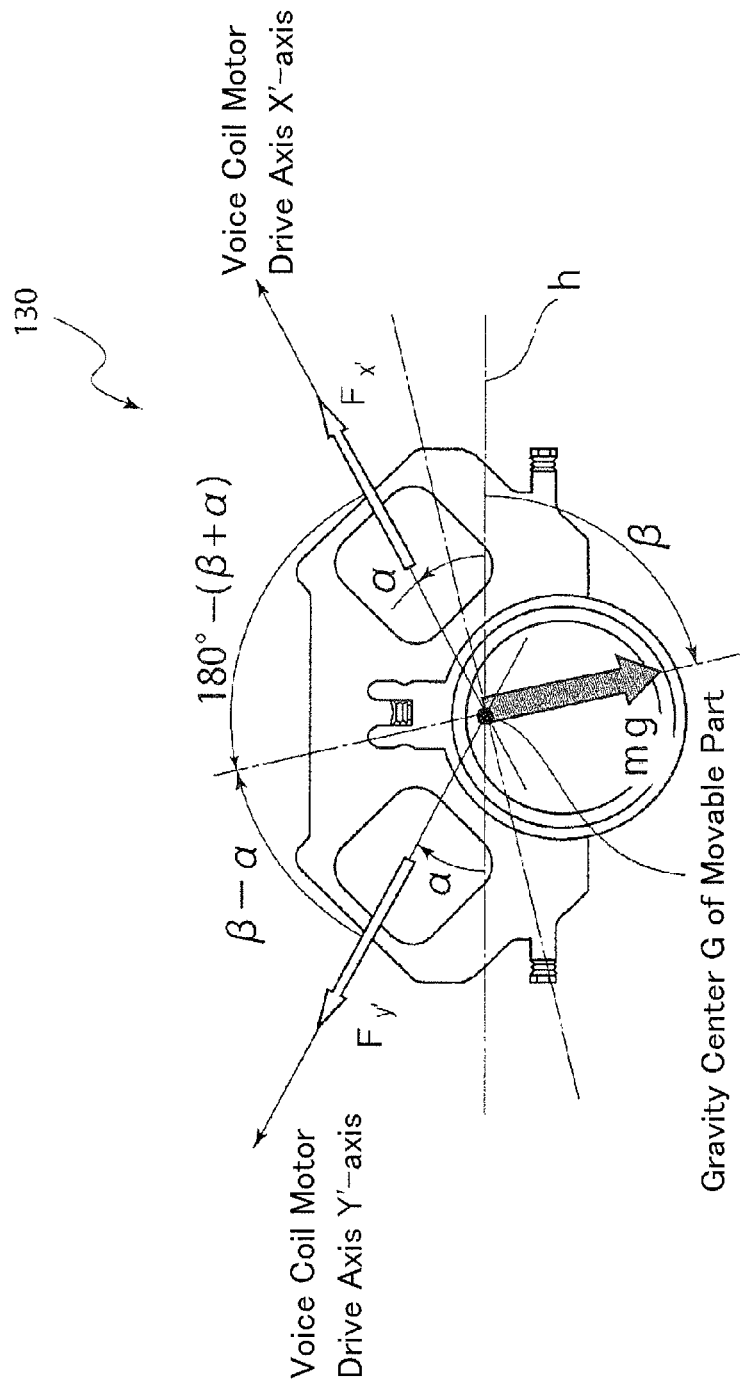
FIG. 12 is a conceptual diagram for determining a positional direction of the movable part with respect to the gravity direction.

In FIG. 12, the following balanced equation of force is realized when the inclined angle of the drive axes X' and Y' of the VCM toward the horizontal axis h is α (deg), the gravity acting the movable part 130 is mg (N) (g is gravitational acceleration (m/s$^2$)), and the inclined angle of the gravity mg toward the horizontal axis h is β (deg).

[numerical formula 21]

$$f_{x'} \cos\{180° - (\beta + \alpha)\} + f_{y'} \cos(\beta - \alpha) = mg \quad \text{(numerical formula 21)}$$

[numerical formula 22]

$$f_{x'} \sin\{180° - (\beta + \alpha)\} = f_{y'} \sin(\beta - \alpha) \quad \text{(numerical formula 22)}$$

$$\rightarrow f_{x'} = f_{y'} \frac{\sin(\beta - \alpha)}{\sin(\beta + \alpha)}$$

When the simultaneous equation of the numerical formula 21 and the numerical formula 22 is solved, the following numerical formula 23 and numerical formula 24 are obtained.

[numerical formula 23]

$$f_{x'} = mg \cdot \frac{1}{\tan(\beta + \alpha)\cos(\beta - \alpha) - \sin(\beta - \alpha)} \cdot \frac{\sin(\beta + \alpha)}{\cos(\beta + \alpha)} \quad \text{(numerical formula 23)}$$

[numerical formula 24]

$$f_{y'} = mg \cdot \frac{1}{\tan(\beta + \alpha)\cos(\beta - \alpha) - \sin(\beta - \alpha)} \cdot \frac{\sin(\beta - \alpha)}{\cos(\beta + \alpha)} \quad \text{(numerical formula 24)}$$

Here, when drive electric currents of the VCMs are $I_x$ and $I_y$ (A) and thrust constants of the VCM are $k_x$ and $k_y$ (N/A, $k_x = k_y = k$ in the present embodiment), the following relation is obtained.

[Numerical Formula 25]

$$f_{x'} = k \cdot I_{x'}, \quad f_{y'} = k \cdot I_{x'} \quad \text{(numerical formula 25)}$$

From the above, the following relation is realized regarding the drive electric currents of the VCMs.

[numerical formula 26]

$$I_{x'} = \frac{mg}{k} \cdot \frac{1}{\tan(\beta + \alpha)\cos(\beta - \alpha) - \sin(\beta - \alpha)} \cdot \frac{\sin(\beta + \alpha)}{\cos(\beta + \alpha)} \quad \text{(numerical formula 26)}$$

[numerical formula 27]

$$I_{y'} = \frac{mg}{k} \cdot \frac{1}{\tan(\beta + \alpha)\cos(\beta - \alpha) - \sin(\beta - \alpha)} \cdot \frac{\sin(\beta - \alpha)}{\cos(\beta + \alpha)} \quad \text{(numerical formula 27)}$$

Here, when resistant elements of the VCMs are $R_{x'}$ and $R_{y'}$ (Ω, $R_{x'} = R_{y'} = R$ in the present embodiment), the electric power consumption P (W) in driving the first VCM 152 and the second VCM 154 is represented by the following numerical formula 28.

[numerical formula 28]

$$P(\beta) = I_{x'}^2 R + I_{y'}^2 R \quad \text{(numerical formula 28)}$$

$$= \frac{Rm^2 g^2}{k^2} \cdot \frac{\sin^2(\beta + \alpha) + \sin^2(\beta - \alpha)}{[\cos(\beta + \alpha) \cdot \{\tan(\beta + \alpha)\cos(\beta - \alpha) - \sin(\beta - \alpha)\}]^2}$$

Figure 13:
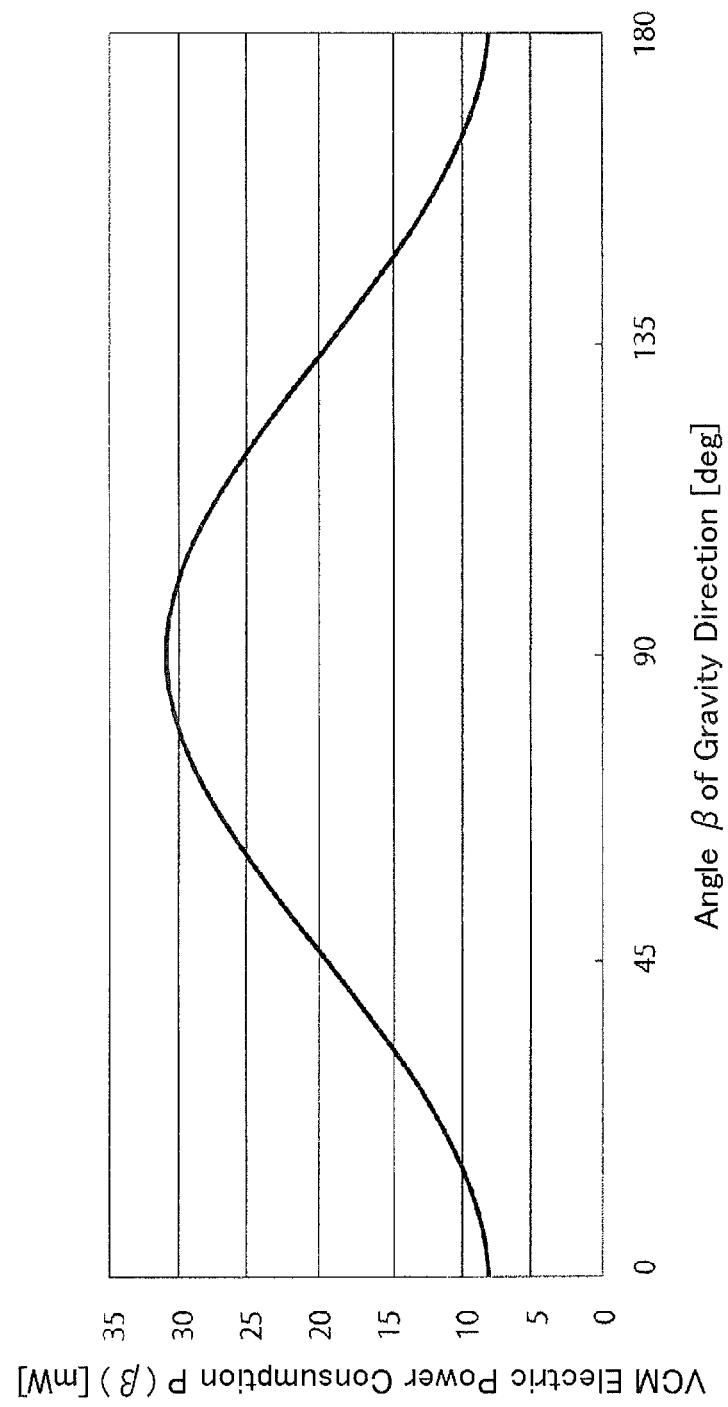
FIG. 13 is a graph showing a relation between a positional direction of the movable part and an electric power consumption of the VCM.

From the numerical formula 28, the inclined angle β of the gravity and the electric power consumption P have a relation shown in FIG. 13. That is, the electric power consumption P is smallest when the inclined angle β of the gravity is 0 (deg) or 180 (deg). On the contrary, the electric power consumption P is largest when β equals 90 (deg). From this, as shown in FIG. 14, the electric power consumption for supporting the movable part 130 is smallest when the movable part 130 is placed so that β equals 0 or β equals 180.

Figure 14A:
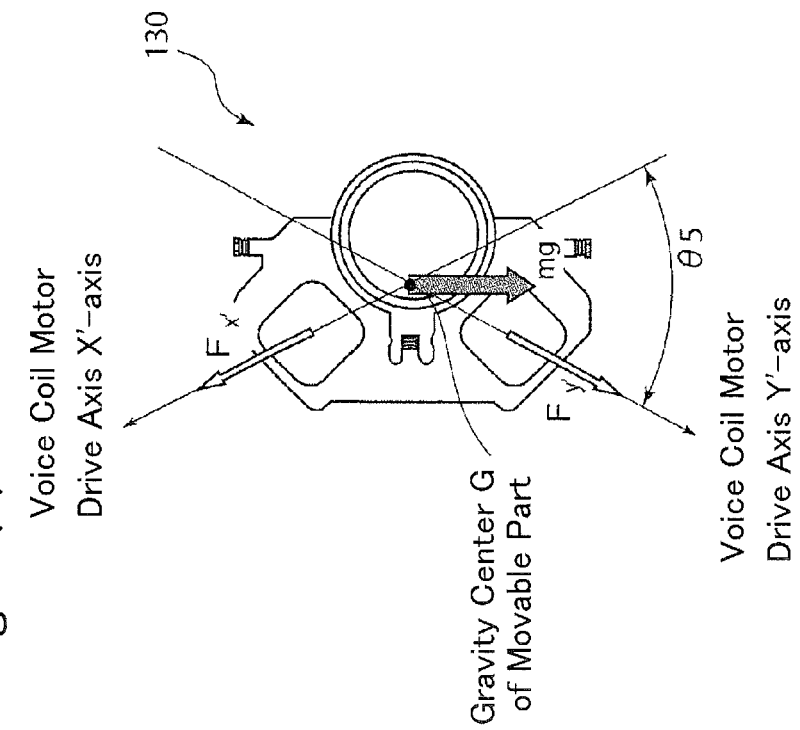
FIG. 14(a) and FIG. 14(b) show directions of optimal positions of the movable part.
Figure 14B:
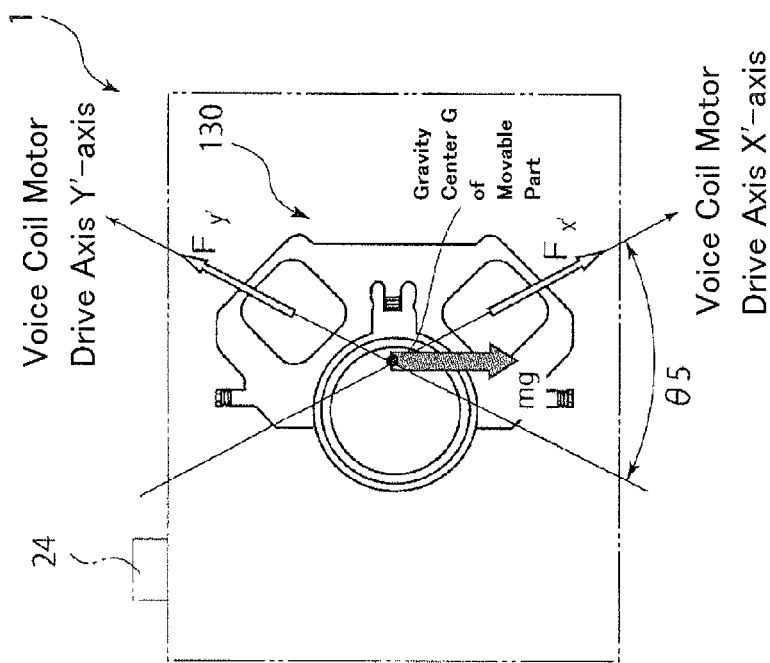

In the present embodiment, as shown in FIG. 14(a) and FIG. 14(b), the first VCM 152 and the second VCM 154 are arranged with respect to the movable part 130 so that the gravity direction is directed to inside of an acute angle $\theta_5$ among angles formed by crossing X'-axis and Y'-axis. Preferably, the first VCM 152 and the second VCM 154 shown in FIG. 6 are arranged with respect to the movable part 130 so that a bisector of the acute angle $\theta_5$ consisted of X'-axis and Y'-axis is directed to the gravity direction. As arranged in this way, when the movable part 130 is moved by the first VCM 152 and the second VCM 154, the driving force can be efficiently acted on to the movable part 130 by utilizing the gravity or cancelling the gravity.

FIG. 14(a) shows an example of arrangement of the blur compensation device 100 (a movable part 130) of the camera 1. The camera 1 comprises a release switch 24 at the upper part thereof and a photographer using the camera 1 often uses it in the state of the release switch 24 directing to the upper part. At this time, by arranging the bisector of the angle $\theta_5$ of the blur compensation device 100 so that it is directed to the gravity direction, the electric power consumption of the blur compensation movement can be reduced and the entire electric power consumption of the camera 1 can be reduced.

Note that, the present invention is not limited to the above embodiments.

The above embodiments describe a blur compensation device of an optical-system moving type which drives the blur compensation lens L3 shown in FIG. 1 and the present invention can be applied to a blur compensation device of an image-sensor moving type which moves the image sensor 3 shown in FIG. 1.

In the above embodiments, the two VCMs are employed as a means of driving the movable part, but the present invention is not limited to this. For example, two or more VCMs may be employed. Other actuators such as piezoelectric actuators may be also used.

In the above embodiment, the two hall effect elements are employed as a means of detecting a position of the movable part, but the present invention is not limited to this. Two or more hall effect elements may be employed. Further, other position detection measures such as PSD sensors may be used as well.

NUMERICAL REFERENCES 1 camera
1a camera body
2 lens barrel
12 angular velocity sensor
14 CPU
100 blur compensation device
110 shutter part
120 position detection part
122 first hall effect element
124 second hall effect element
130 movable part
132 first magnet
134 second magnet
140 fixed part
142 first drive coil
144 second drive coil
145 pulling coil spring
148 ceramic balls
150 screws
152 first VCM
154 second VCM
162 target position command generating part
164 subtracter
166 feedforward controller
168 feedback controller
170 adder
L3 blur compensation lens
G gravity center of movable part
M drive axis origin
O center of lens

The invention claimed is:

1. A blur compensation device comprising:
   a movable member provided with a blur compensation member, the movable member is movable relative to a fixed member on a predetermined drive face, for compensating an image blur formed by an optical system, the movable member having a gravity center located away from a center of the blur compensation member;
   a first drive member which moves the movable member along a first axis on the predetermined drive face;
   a second drive member which moves the movable member along a second axis that crosses the first axis and is on the predetermined drive face;
   a first detection part which detects a position of the movable member along a third axis that crosses an optical axis of the optical system; and
   a second detection part which detects a position of the movable member along a fourth axis that crosses the third axis and the optical axis of the optical system, wherein
   an intersection point of the first axis with the second axis is located nearer to the gravity center of the movable member than the center of the blur compensation member on the predetermined drive face,
   the first drive member and the first detection part are placed at a position including an intersection point of the third axis with the first axis, and
   the second drive member and the second detection part are placed at a position including an intersection point of the fourth axis with the second axis.

2. The blur compensation device as set forth in claim 1, wherein the first axis and the second axis cross at an angle which is not perpendicular.

3. The blur compensation device as set forth in claim 1, wherein each of the first drive member and the second drive member generates a driving force in an inclined direction to the center of the blur compensation member.

4. The blur compensation device as set forth in claim 1, wherein the predetermined drive face crosses the optical axis of the optical system.

5. The blur compensation device as set forth in claim 1, wherein the blur compensation member is at least a part of the optical system.

6. The blur compensation device as set forth in claim 1, wherein the third axis and the fourth axis intersect perpendicularly.

7. The blur compensation device as set forth in claim 1, wherein the intersection point of the first axis with the second axis is in between the gravity center of the movable member and the center of the blur compensation member on the predetermined drive face.

8. The blur compensation device as set forth in claim 1, further comprising
   a blur detection part which outputs a blur signal in accordance with an image blur formed by the optical system and
   a control unit which controls the first drive member and the second drive member by using the blur signal.

9. The blur compensation device as set forth in claim 8, wherein the control unit controls the first drive member and the second drive member based on a positional information from the first detection part and the second detection part and the blur signal.

10. The blur compensation device as set forth in claim 1, wherein the first drive member and the second drive member are placed with respect to the movable member so that a direction of gravity is in a range of an acute angle formed by crossing the first axis with the second axis.

11. A camera device comprising the blur compensation device as set forth in claim 1.

12. A lens barrel comprising the blur compensation device as set forth in claim 1.

13. A manufacturing method for a blur compensation device, the method comprising the steps of:
    providing a movable member provided with a blur compensation member for compensating an image blur formed by an optical system, the movable member is movable relative to a fixed member on a predetermined drive face, the movable member having a gravity center located away from a center of the blur compensation member;
    providing a first drive member which moves the movable member along a first axis on the predetermined drive face;
    providing a second drive member which moves the movable member along a second axis that crosses the first axis and is on the predetermined drive face;
    providing a first detection part which detects a position of the movable member along a third axis that crosses an optical axis of the optical system; and
    providing a second detection part which detects a position of the movable member along a fourth axis that crosses the third axis and the optical axis of the optical system, wherein
    an intersection point of the first axis with the second axis is located nearer to the gravity center of the movable member than the center of the blur compensation member on the predetermined drive face,
    the first drive member and the first detection part are placed at a position including an intersection point of the third axis with the first axis, and
    the second drive member and the second detection part are placed at a position including an intersection point of the fourth axis with the second axis.

14. The manufacturing method for the blur compensation device as set forth in claim 13, wherein the first axis and the second axis cross at an angle which is not perpendicular.

15. The manufacturing method for the blur compensation device as set forth in claim 13, wherein each of the first drive member and the second drive member generate a driving force in an inclined direction to the center of the blur compensation member.

16. The manufacturing method for the blur compensation device as set forth in claim 13, wherein the predetermined drive face crosses the optical axis of the optical system.

17. The manufacturing method for the blur compensation device as set forth in claim 13, wherein the blur compensation member is at least a part of the optical system.

18. The manufacturing method for the blur compensation device as set forth in claim 13, wherein the third axis and the fourth axis intersect perpendicularly.

19. The manufacturing method for the blur compensation device as set forth in claim 13, wherein the intersection point of the first axis with the second axis is in between the gravity center of the movable member and the center of the blur compensation member on the predetermined drive face.

20. The manufacturing method for the blur compensation device as set forth in claim 13, further comprising the steps of
    providing a blur detection part which outputs a blur signal in accordance with an image blur formed by the optical system and
    providing a control unit which controls the first drive member and the second drive member by using the blur signal.

21. The manufacturing method for the blur compensation device as set forth in claim 20, wherein
    the control unit controls the first drive member and the second drive member based on a positional information from the first detection part and the second detection part and the blur signal.

22. The manufacturing method for the blur compensation device as set forth in claim 13, wherein the first drive member and the second drive member are placed with respect to the movable member so that a direction of gravity is in a range of an acute angle formed by crossing the first axis with the second axis.

23. A manufacturing method for a camera device comprising the manufacturing method for the blur compensation device as set forth in claim 13.

24. A manufacturing method for a lens barrel comprising the manufacturing method for the blur compensation device as set forth in claim 13.

* * * * *